(12) United States Patent
Pinheiro et al.

(10) Patent No.: US 8,794,890 B2
(45) Date of Patent: Aug. 5, 2014

(54) VARIABLE WALL THICKNESS COLLAR

(75) Inventors: Rodrigo Pinheiro, Riverside, CA (US);
Elaine Koontz, Manhattan Beach, CA (US); Luke Haylock, Culver City, CA (US)

(73) Assignee: Alcoa Inc., Pittsburgh, PA (US)

( * ) Notice: Subject to any disclaimer, the term of this patent is extended or adjusted under 35 U.S.C. 154(b) by 109 days.

(21) Appl. No.: 13/589,615

(22) Filed: Aug. 20, 2012

(65) Prior Publication Data
US 2014/0050551 A1    Feb. 20, 2014

(51) Int. Cl.
*F16B 19/05*    (2006.01)

(52) U.S. Cl.
CPC ....................... *F16B 19/05* (2013.01)
USPC ........................................................... 411/361

(58) Field of Classification Search
CPC ........ F16B 19/05; F16B 39/026; B21J 15/022
USPC ........................................................... 411/361
See application file for complete search history.

(56) References Cited

U.S. PATENT DOCUMENTS

| | | | |
|---|---|---|---|
| 2,531,049 A * | 11/1950 | Huck | 411/361 |
| 2,804,798 A * | 9/1957 | Brilmyer | 411/361 |
| 3,057,246 A * | 10/1962 | Brilmyer | 411/361 |
| 3,094,017 A | 6/1963 | Champoux et al. | |
| 3,560,124 A | 2/1971 | Bergere | |
| 4,112,811 A * | 9/1978 | King | 411/361 |
| 4,197,782 A * | 4/1980 | Champoux | 411/361 |
| 4,198,895 A | 4/1980 | Ruhl | |
| 4,254,809 A | 3/1981 | Schuster | |
| 4,472,096 A | 9/1984 | Ruhl et al. | |
| 4,921,384 A * | 5/1990 | Nordyke | 411/361 |
| 5,049,016 A | 9/1991 | Nordyke | |
| 5,090,852 A | 2/1992 | Dixon | |
| 5,125,778 A * | 6/1992 | Sadri | 411/361 |
| 5,604,968 A | 2/1997 | Fulbright et al. | |
| 6,233,802 B1 | 5/2001 | Fulbright | |
| 6,325,582 B1 | 12/2001 | Sadri et al. | |
| 6,497,024 B2 * | 12/2002 | Fulbright | 29/243.522 |
| 6,702,684 B2 | 3/2004 | Harbin et al. | |
| 7,025,550 B2 | 4/2006 | Monserratt et al. | |
| 7,195,438 B2 | 3/2007 | Harbin et al. | |
| 7,695,226 B2 * | 4/2010 | March et al. | 411/43 |
| 7,891,924 B2 | 2/2011 | Mercer et al. | |
| 7,896,598 B2 | 3/2011 | Mercer et al. | |
| 7,921,530 B2 | 4/2011 | Mercer et al. | |

FOREIGN PATENT DOCUMENTS

GB    766137 A    1/1957

OTHER PUBLICATIONS

International Search Report and Written Opinion in connection with PCT/US2013/054509.

* cited by examiner

*Primary Examiner* — Flemming Saether
(74) *Attorney, Agent, or Firm* — Greenberg Traurig, LLP

(57) ABSTRACT

A collar having a shank with an interior surface and an exterior surface. The exterior surface of the shank includes a first exterior surface extending from the first end to a first exterior inflection point, and a curvilinear exterior surface extending from the first exterior inflection point to a second exterior inflection point. The curvilinear exterior surface and an imaginary line extending from the first exterior inflection point to the second exterior inflection point form a first area that is sized and shaped to receive forward extrusion of the collar as the collar is being installed.

12 Claims, 10 Drawing Sheets

VARIABLE WALL THICKNESS COLLAR

FIELD OF THE INVENTION

The present invention relates to a collar, and, more particularly, to a collar having a variable wall thickness.

BACKGROUND OF THE INVENTION

Currently, swaged collar fasteners are frequently utilized to fasten workpieces, which usually consist of two or more plates or panels having substantially aligned openings. The fastener includes a collar and a pin. The pin has a head on one end, and a pintail with lock-grooves and pull-grooves on the opposite the end. The pin is inserted through the aligned openings from one side of the workpiece, and a collar is inserted over the pin at the opposite side of the workpiece for subsequent swaging to the pin. When set or installed, the pin head engages the outside surface of one of the plate members and the collar engages the outside surface of the other plate member.

One conventional method for setting the collar on the pin is by the use of a pull-type installation tool which grasps and pulls the pull-grooves of the pin while simultaneously applying a reaction force to the collar. After a certain pulling force is reached, the collar is locked on the pin by the depression of the collar metal flowing into the lock-grooves on the pin. More particularly, the installation tool includes a jaw assembly, which engages the pull-grooves on the pintail, and a swaging anvil, which engages the collar. As the tool is actuated, the jaws exert a pulling action on the pin and the swaging anvil applies the reaction force to the collar. As the workpiece plates are drawn together, the pin head engages the outside surface of one of the plates and the collar engages the outside surface of the other plate. Continued pulling action of the tool increases the tool swaging load as the swaging anvil strokes or progresses over the collar in the direction of the flange of the collar. When the installation tool breaks off the pull-groove portion of the pintail from the pin, at the completion of the swaging action, the installation tool is removed and the installation of the collar fastener is complete.

With a collar design having a constant shank wall thickness, during the swaging process, part of the collar material is gradually forward extruded, thereby increasing the installation tool swaging load necessary to fully swage the collar. More particularly, as the anvil of the installation tool progresses over the collar shank material, the material is deformed against the pin by the anvil. During this process, part of the shank material that is adjacent to the contact point of the anvil is also pushed forward to form a forward-extrusion. The forward-extrusion is the portion of the shank material that is pushed ahead of the anvil. In other words, the thickness of the shank wall increases ahead of the tool, as the tool displaces material forward. The increase in thickness in the shank wall produces increases in tool swaging loads that are undesirable.

What is also needed is a built-in mechanism to stop the progression of the anvil of the installation tool, when it reaches an adequate depth or stroke length on the collar. For instance, the installation tool might displace the anvil all the way to the flange of the collar or the sheet line zone (i.e., the zone on the surface of the workpiece that mates with the bottom of the flange). This creates high peak pressure on the collar bearing surface that bears on the sheet line zone, which promotes collar splaying (i.e., curling of portions of the flange away from the sheet line zone of the workpiece). High peak pressure also poses the risk of damage to work-piece members that are made of sensitive materials such as composites.

SUMMARY OF THE INVENTION

In an embodiment, a collar includes a first end and a second end opposite the first end, a longitudinal axis extending from the first end to the second end, and a shank extending from the first end to the second end and including an interior surface and an exterior surface, wherein the interior surface of the shank includes a cylindrical-shaped first interior surface extending from the first end to a first interior inflection point, a frusto-conical-shaped second interior surface extending from the first interior inflection point to a second interior inflection point, and a cylindrical-shaped third interior surface extending from the second interior inflection point to the second end, wherein the exterior surface of the shank includes a first exterior surface extending from the first end to a first exterior inflection point, and a curvilinear exterior surface extending from the first exterior inflection point to a second exterior inflection point, and wherein the curvilinear exterior surface and an imaginary line extending from the first exterior inflection point to the second exterior inflection point form a first area that is sized and shaped to receive forward extrusion of the collar as the collar is being installed.

In an embodiment, each of the first and third interior surfaces is oriented parallel to the longitudinal axis, and the second interior surface is oriented oblique to the longitudinal axis. In an embodiment, the first interior surface and the first exterior surface form a first zone having a first thickness, and wherein the curvilinear exterior surface and a first area on the interior surface adjacent to the curvilinear exterior surface form a second zone having a second thickness. In an embodiment, the second thickness of the second zone is less than the first thickness of the first zone. In an embodiment, the second thickness of the second zone increases as the collar is being installed.

In an embodiment, the exterior surface of the shank includes a protrusion positioned proximate to the second end. In an embodiment, the exterior surface includes a third exterior surface, and wherein the protrusion extends longitudinally from the second exterior inflection point to the third exterior surface. In an embodiment, the third exterior surface terminates at a flange. In an embodiment, the protrusion is an annular protrusion. In an embodiment, the annular protrusion is ring-shaped. In another embodiment, the annular protrusion is curvilinear in shape. In an embodiment, the exterior surface includes a plurality of cogs positioned proximate to the second end.

BRIEF DESCRIPTION OF THE DRAWINGS

For a more complete understanding of the present invention, reference is made to the following detailed description of an exemplary embodiment considered in conjunction with the accompanying drawings, in which:

FIG. 5 is a cross-sectional view, taken along section line 5-5 and looking in the direction of the arrows, of the collar shown in FIG. 1, while

DETAILED DESCRIPTION OF THE EXEMPLARY EMBODIMENT

Figure 1:
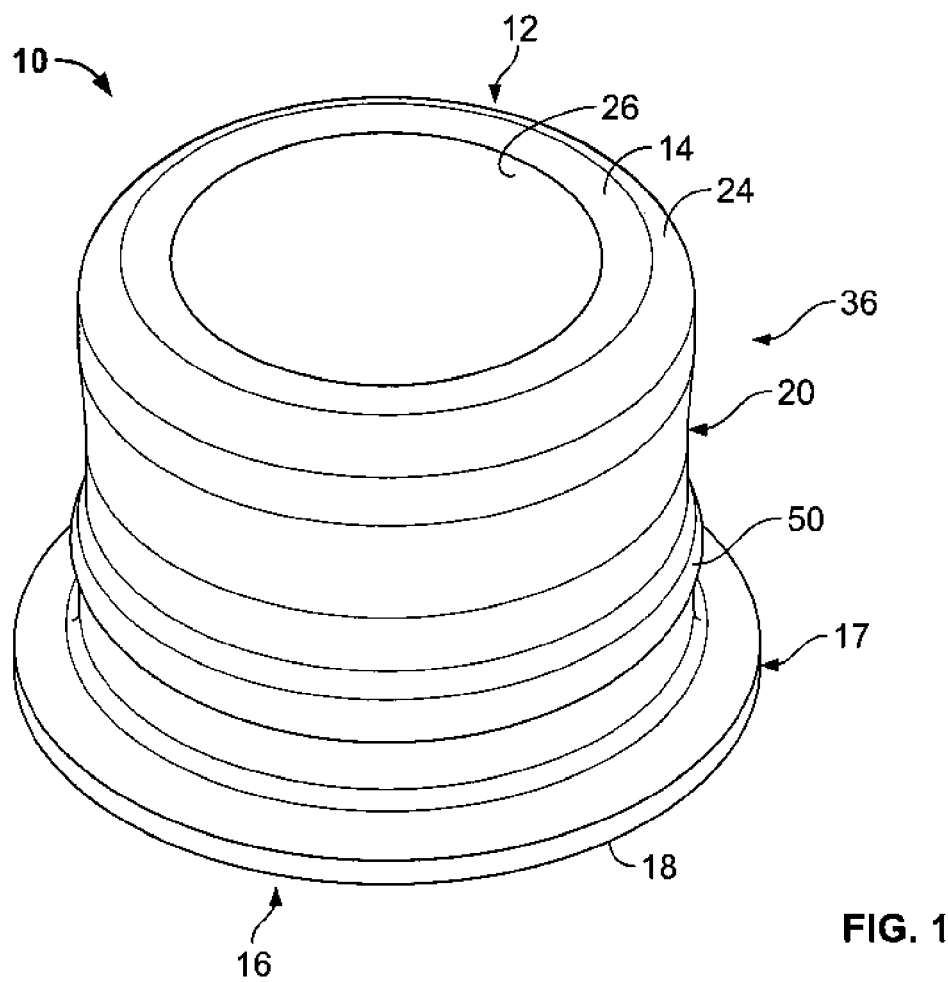
FIG. 1 is perspective view of a collar constructed in accordance with a first embodiment of the present invention.
Figure 2:
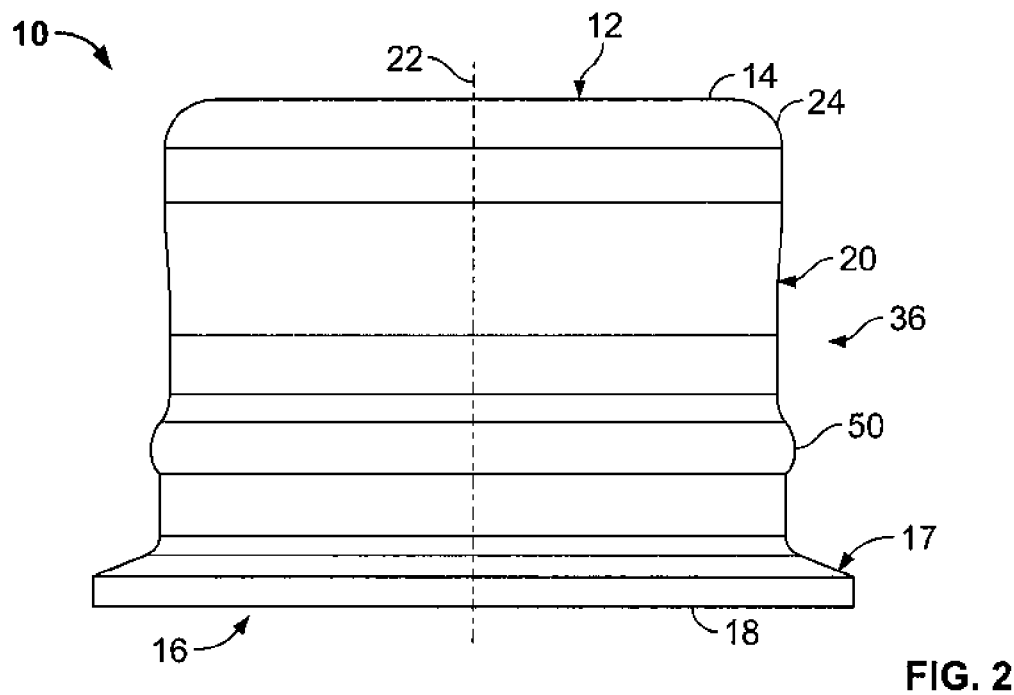
FIG. 2 is a side elevational view of the collar shown in FIG. 1.
Figure 3:
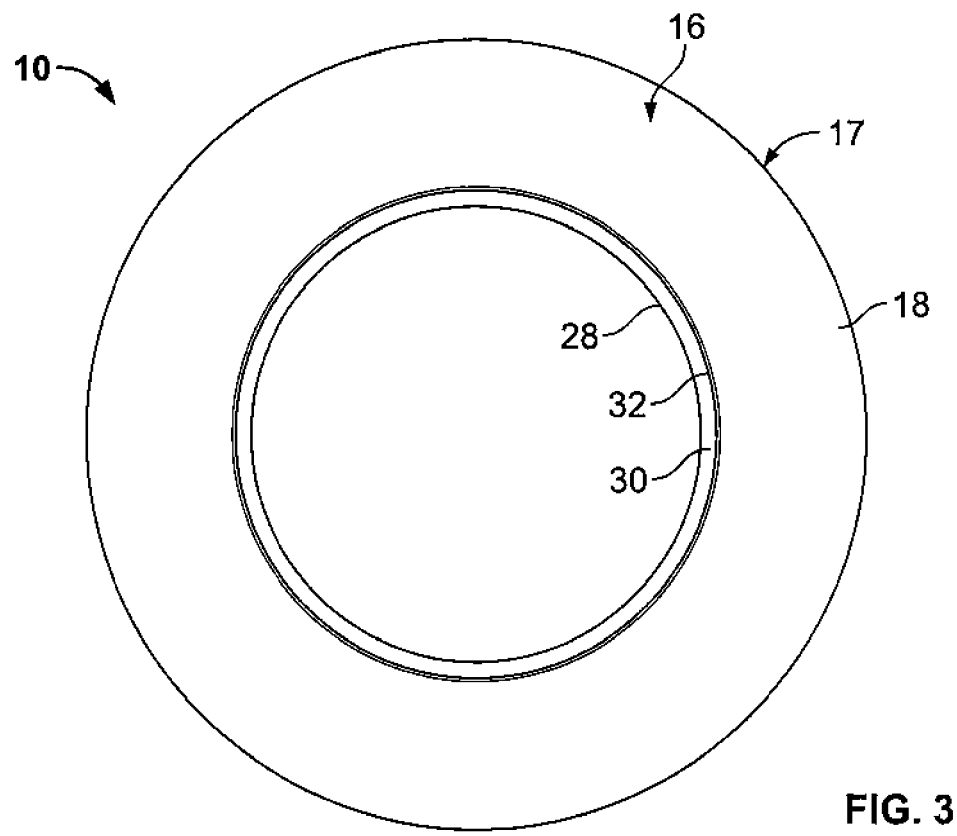
FIG. 3 is a bottom plan view of the collar shown in FIG. 1.
Figure 4:
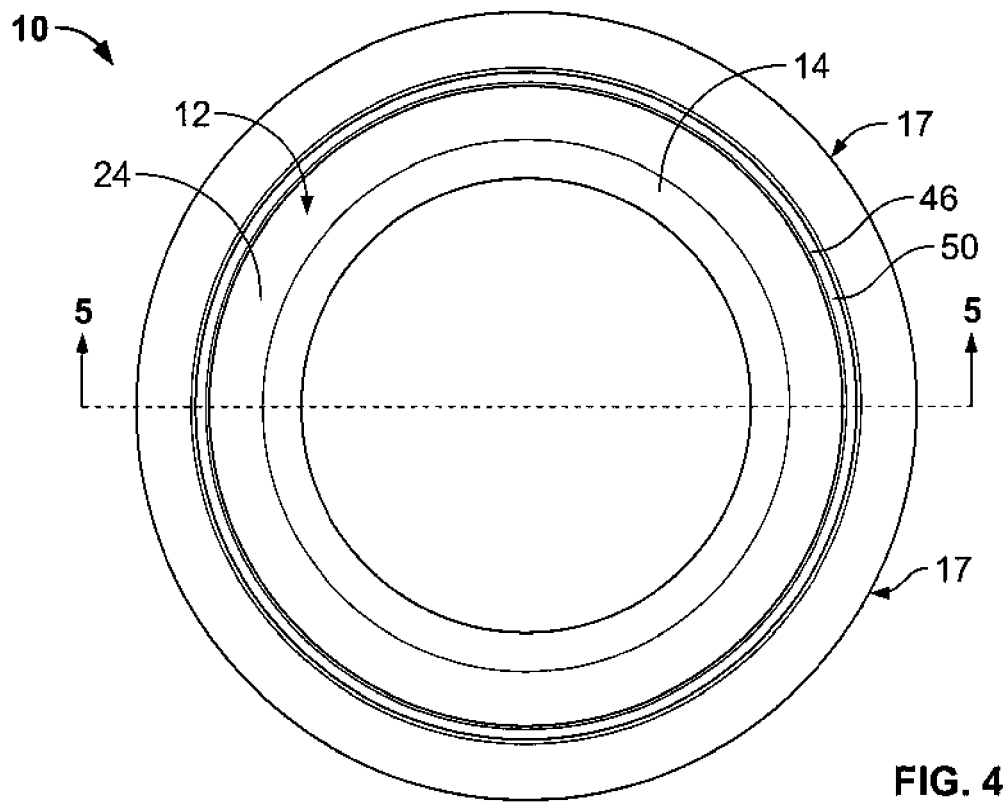
FIG. 4 is a top plan view of the collar shown in FIG. 1.

Although the present invention can be used in conjunction with a swage-type fastening system, it is particularly suitable for use in connection with swage-type collars on pin members having pintails. Accordingly, the present invention will be described hereinafter in connection with such a collar. It should be understood, however, that the following description is only meant to be illustrative of the present invention and is not meant to limit the scope of the present invention, which has applicability to other types of fastening systems, collars and/or pin members.

FIGS. 1-6 illustrate a variable wall thickness collar 10 that is constructed in accordance with an embodiment of the present invention. In an embodiment, the collar 10 includes a first end 12 having a flat surface 14, and a second end 16 opposite the first end 12 and having a flange 17 with a flat surface 18. In an embodiment, the second end 16 faces the work-piece (although the work-piece is not shown in FIGS. 1-6, see for example, the work-piece W illustrated in FIG. 8) when it is installed in a manner described hereinbelow. In an embodiment, a tubular-shaped wall or shank 20, which extends from the first end 12 to the second end 16, is centered axi-symetrically around a longitudinal axis 22. In an embodiment, beginning at the surface 14, a curved corner 24 is formed on the exterior periphery thereof.

Figure 5:
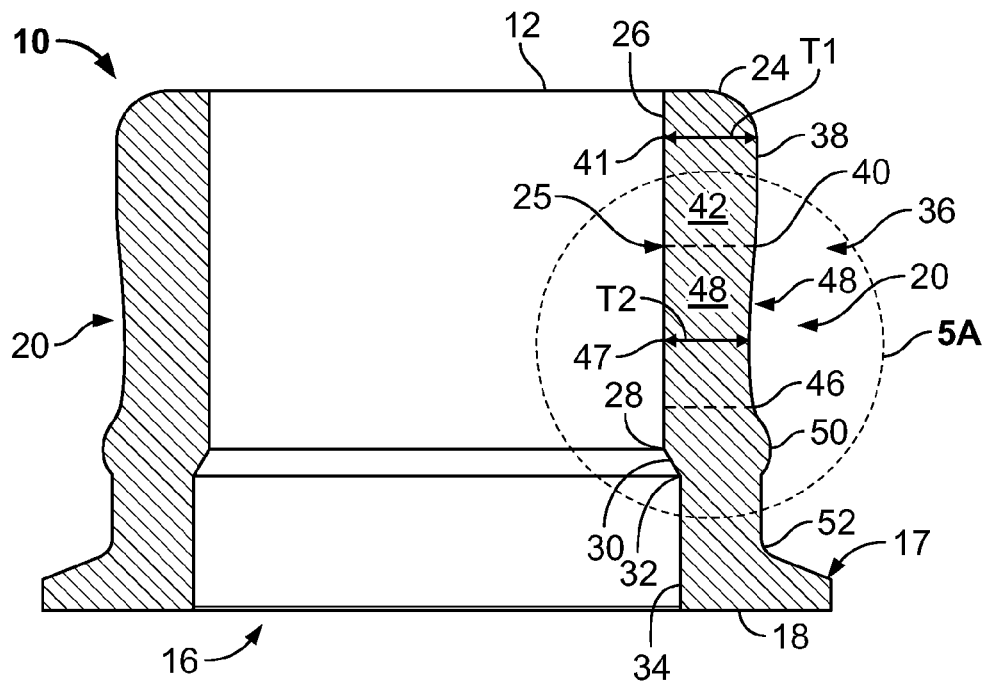
Figure 5A:
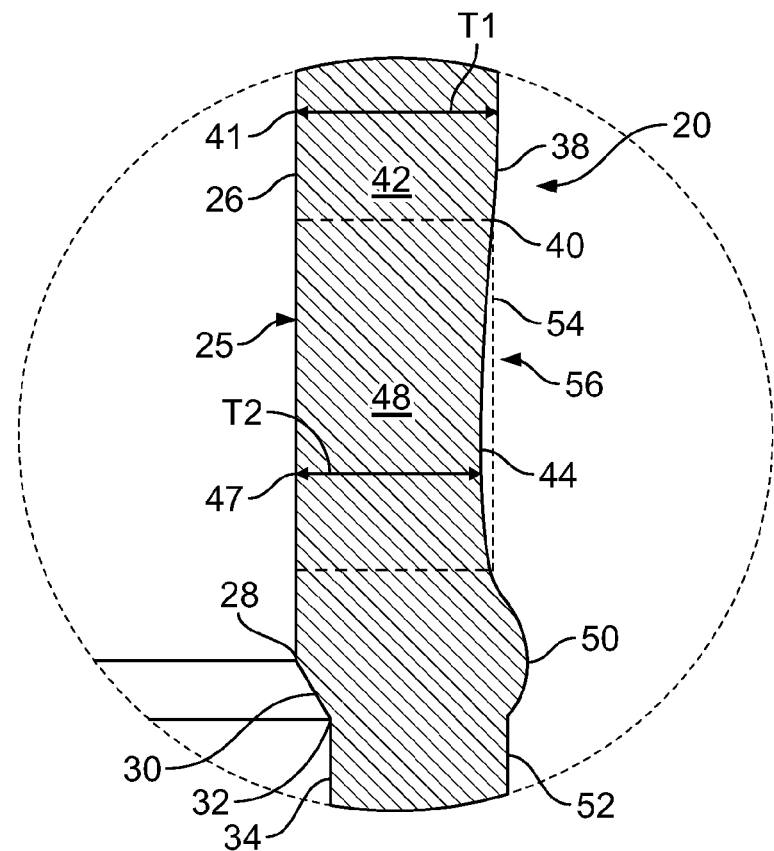
FIG. 5A is an enlarged view of the circled area 5A of FIG. 5.

Referring to FIGS. 5 and 5A, the variable interior surface or profile 25 of the collar 10 includes the following features. In an embodiment, beginning at the surface 14, a cylindrical-shaped first interior surface 26 of the shank 20 extends to a first interior inflection point 28. In an embodiment, the first interior surface 26 is oriented parallel to the longitudinal axis 22. In an embodiment, from the first interior inflection point 28, a frusto-conical-shaped second interior surface 30 is oriented obliquely to the longitudinal axis 22. In an embodiment, the second interior surface 30 extends from the first interior inflection point 28 to a second interior inflection point 32. In an embodiment, a cylindrical-shaped third interior surface 34 extends from the second interior inflection point 32 to the surface 18 of the second end 16. In an embodiment, the orientation of the third interior surface 34 is parallel to the longitudinal axis 22.

Continuing to refer to FIGS. 5 and 5A, in an embodiment, the shank 20 has a variable shaped exterior surface or profile 36 that is centered axi-symetrically around the longitudinal axis 22 of the collar 10. In an embodiment, the exterior surface 36 includes the following features. In an embodiment, beginning at the surface 14 of the collar 10, the corner 24 extends from the surface 14 to a first exterior surface 38. In an embodiment, the first exterior surface 38 extends to a first exterior inflection point 40. In an embodiment, the first exterior surface 38 and an adjacent area 41 of the first interior surface 26 combine to define a first zone 42 on the shank 20 that has a first thickness T1.

Figure 6:
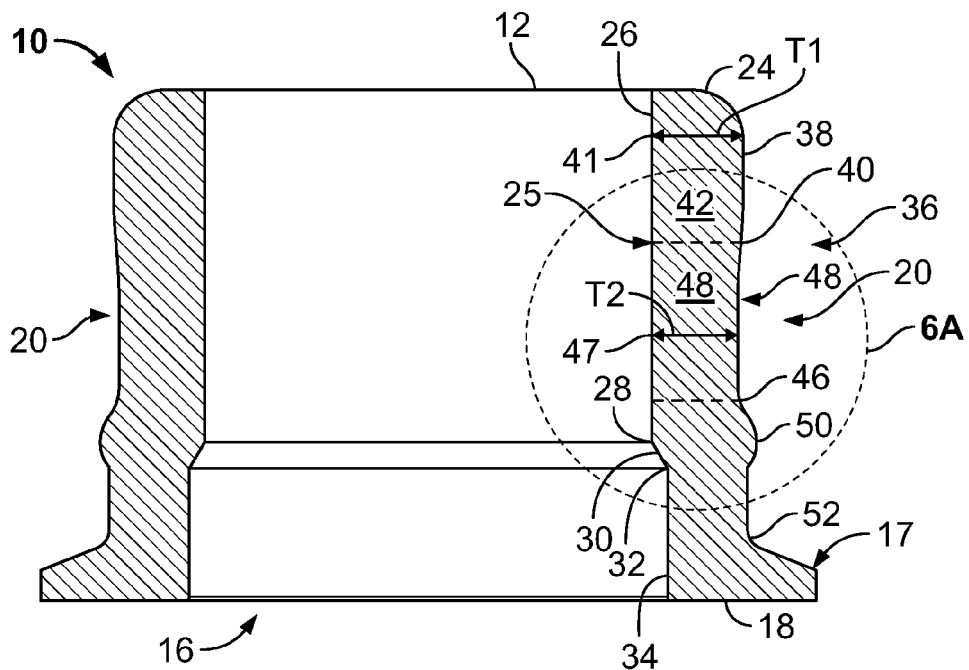
FIGS. 6 and 6A show another embodiment of a collar.
Figure 6A:
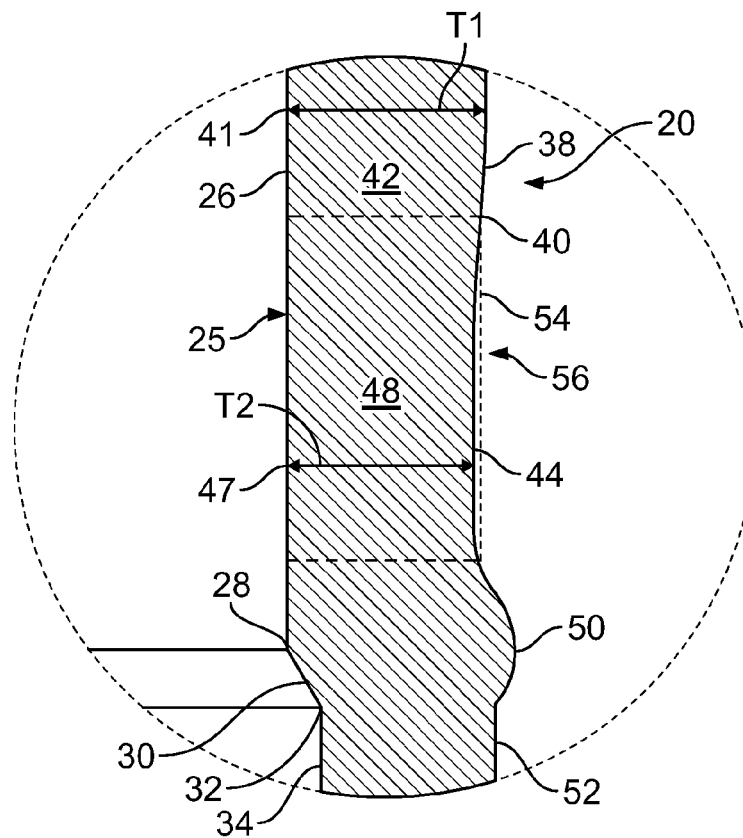

Referring specifically to FIG. 5A, in an embodiment, a curvilinear surface 44 extends from the first exterior inflection point 40 to a second exterior inflection point 46. In another embodiment, the surface 44 is linear (see FIGS. 6 and 6A). In an embodiment, as shown in FIG. 5A, the curvilinear surface 44 and an adjacent area 47 of the first interior surface 26 combine to define a second zone 48 on the shank 20 that has a second thickness T2. In an embodiment, the second thickness T2 is a minimum thickness. In an embodiment, the thickness T2 is less than the first thickness T1 of the first zone 42. In an embodiment, a protrusion 50 extends from the second exterior inflection point 46 to a third flat exterior surface 52. In an embodiment, the third exterior surface 52 terminates at the flange 17 of the collar 10. In an embodiment, the protrusion 50 acts as a tool stop, as described hereinbelow. In an embodiment, the protrusion 50 has an annular ring-shape. In another embodiment, the protrusion 50 may have a sloping step, land or ledge shape (not shown in the Figures).

Continuing to refer to FIG. 5A, it shows an imaginary line 54 (i.e., dotted line) depicting an extension of the first exterior surface 38, which extends from the first exterior inflection point 40 to and intersects with the protrusion 50 at the second exterior inflection point 46. In an embodiment, the dotted line 54 and the curvilinear surface 44 combine to bound an area 56, the significance of which is described hereinbelow.

Figure 7:
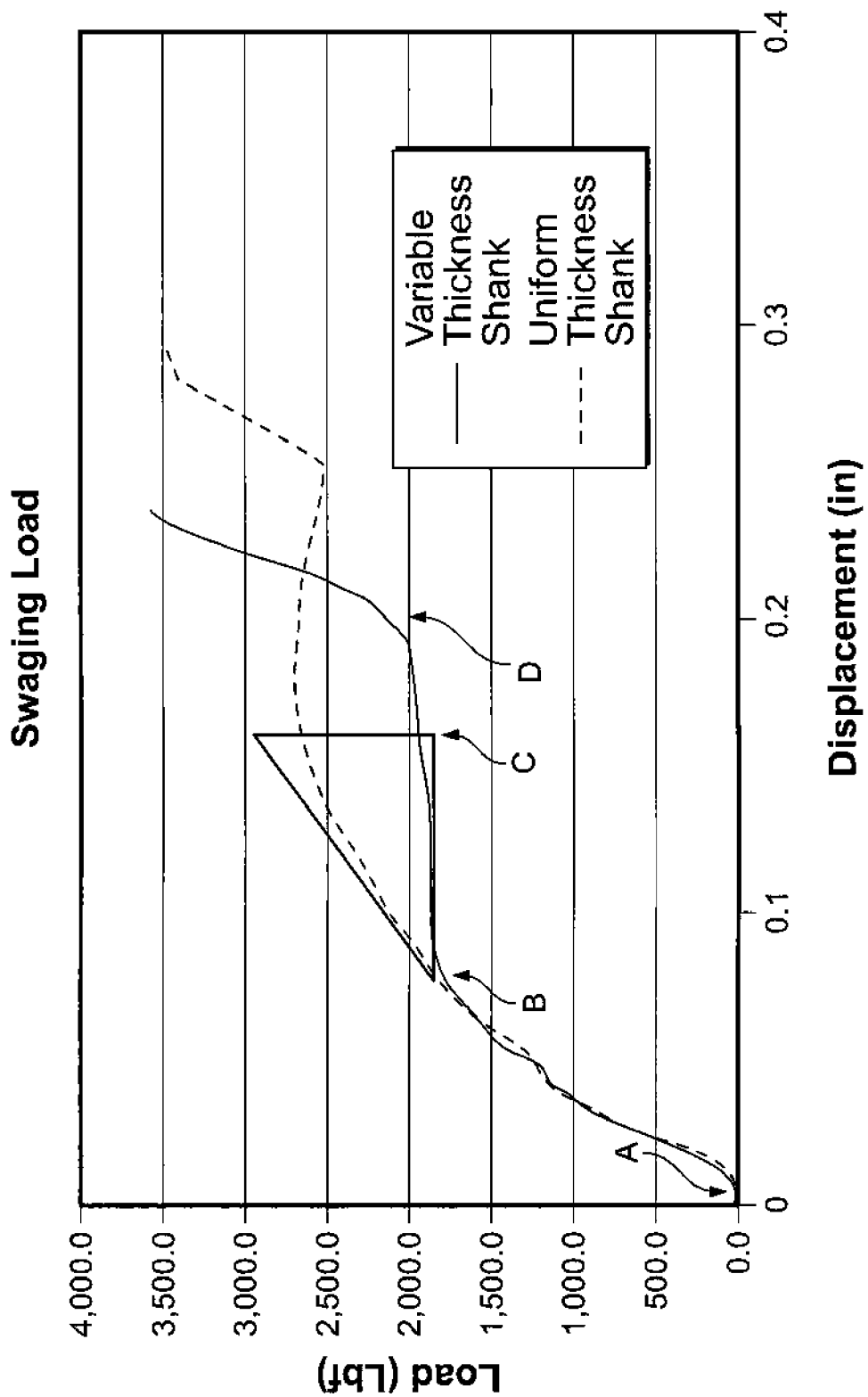
FIG. 7 is a graph depicting the swaging load acting on the installation tool versus the displacement of the anvil during installation of the collar, wherein the solid line represents the application of the tool on the inventive collar and the dashed line represents the application of the tool on a collar lacking the variable thickness feature.

In an embodiment, the collar 10 is installed on a pin member in the manner described hereinabove. More particularly, with reference to FIG. 7, as an anvil of an installation tool progresses first over the exterior periphery of the corner 24 and then over the first exterior surface 38 of the first zone 42, forward extrusion is produced and a swaging load builds up, as depicted in FIG. 7, i.e., when moving from the point A to the point B on the solid-line curve shown in the graph. In an embodiment, as the anvil travels over the curvilinear surface 44 of the second zone 48 towards the protrusion 50, forward extrusion moves in the area 56 and the thickness T2 of the second zone 48 increases. During this portion of the travel of the anvil, the swaging load levels off, as depicted in FIG. 7, i.e., when moving from point B to point C on the solid-line curve shown on the graph. In comparison, for a similarly constructed collar with uniform wall thickness undergoing the same swaging process, continuously increasing swaging loads are seen when moving from point B to point C on the dotted-line curve on the graph of FIG. 7, such continuously increasing loads far surpassing the leveled off swaging loads of the collar 10 as seen when moving from point B to point C on the solid-line curve on the graph of FIG. 7. In an embodiment, when the anvil contacts the protrusion 50 of the collar 10, at point D on the solid-line curve on the graph of FIG. 7, the swaging load spikes and the swaging tool disconnects from the collar 10 in the conventional manner described hereinabove. In an embodiment, it is also at this point that the anvil imprints final witness marks on the protrusion 50 (i.e., slight impressions on the protrusion 50 of the exterior surface 36 of the collar 10 that are created by the passage of the anvil over the collar 10 during the swaging process). More particularly, the observation of the final witness-marks (i.e., the witness-marks that are left at the end of the travel of the anvil) on the protrusion 50 (or the lobes or cogs 119 as described below), provides positive evidence that the anvil has traveled over the exterior surface 36 of the shank 20 of the collar 10 the required distance that is necessary for properly setting the collar 10 on the pin P.

Figure 8:
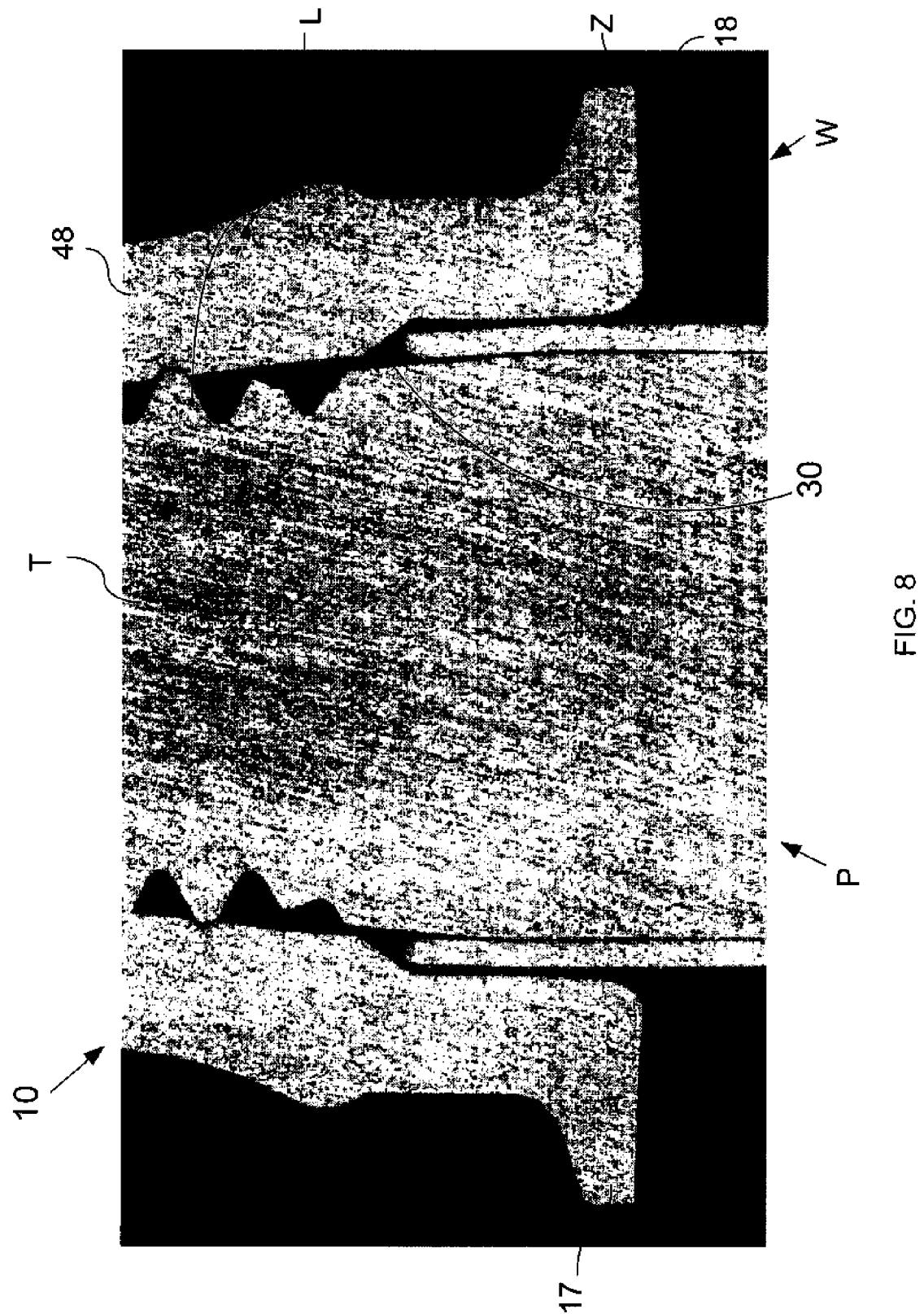
FIG. 8 is a photograph of a portion of a cross-section of the collar shown in FIG. 5 installed on lock-grooves of a pintail portion of a pin member.
Figure 9:
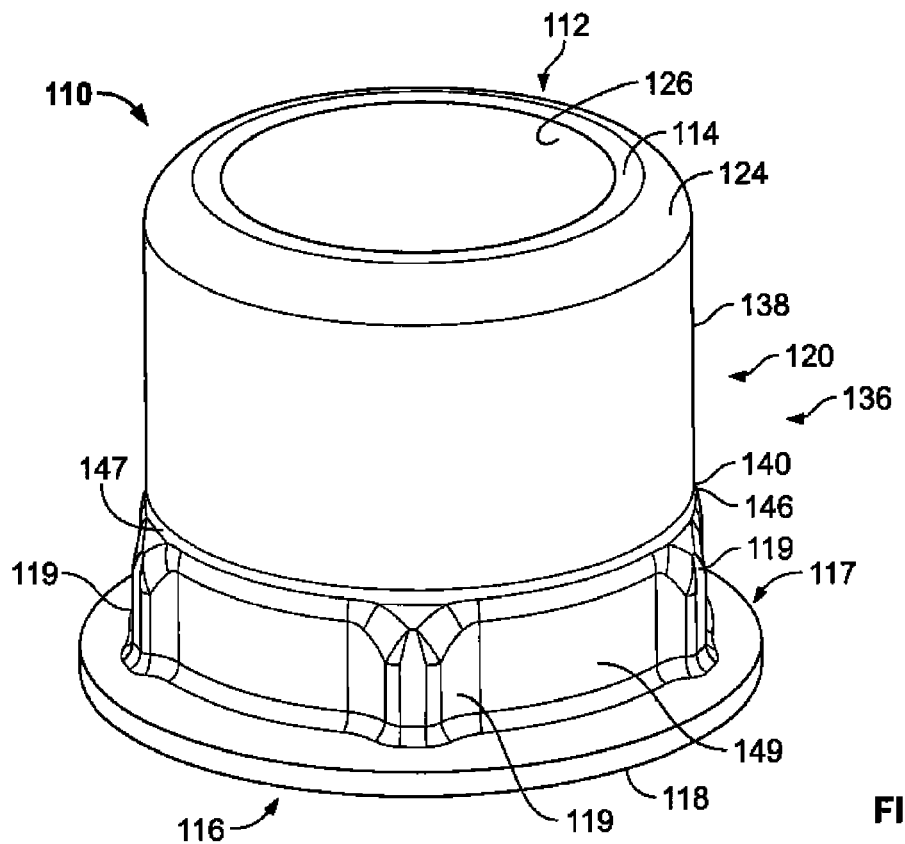
FIG. 9 is perspective view of a collar constructed in accordance with a second embodiment of the present invention.
Figure 10:
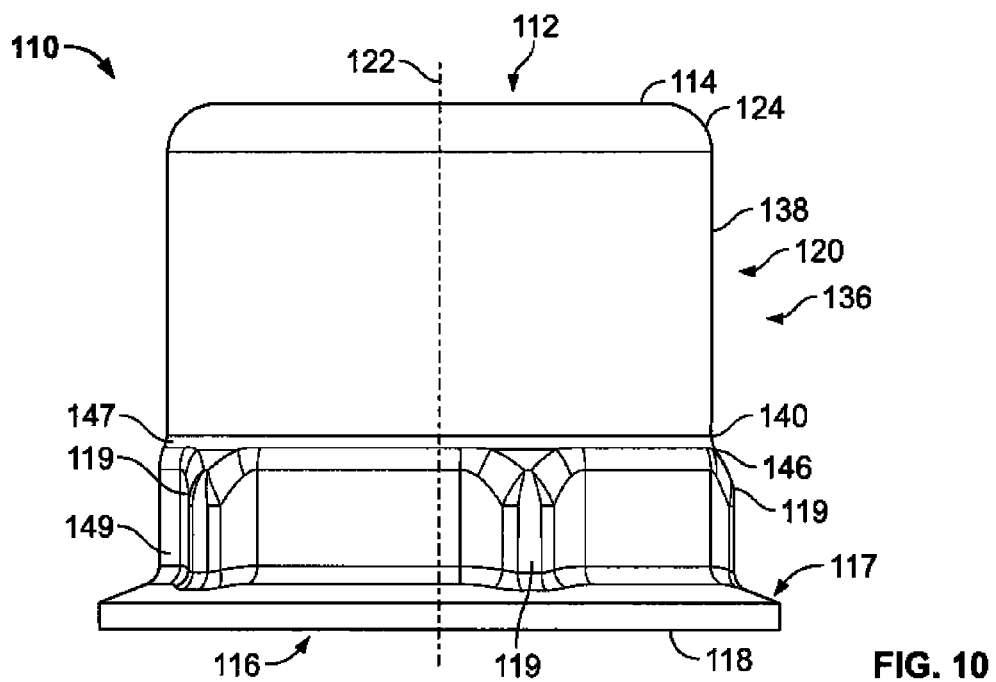
FIG. 10 is a side elevational view of the collar shown in FIG. 9.
Figure 11:
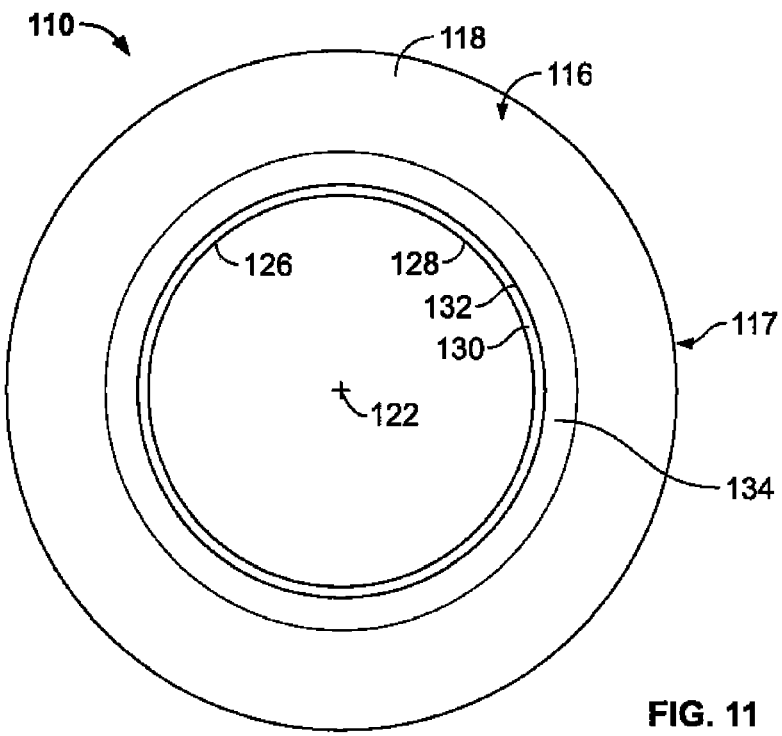
FIG. 11 is a bottom plan view of the collar shown in FIG. 9.
Figure 12:
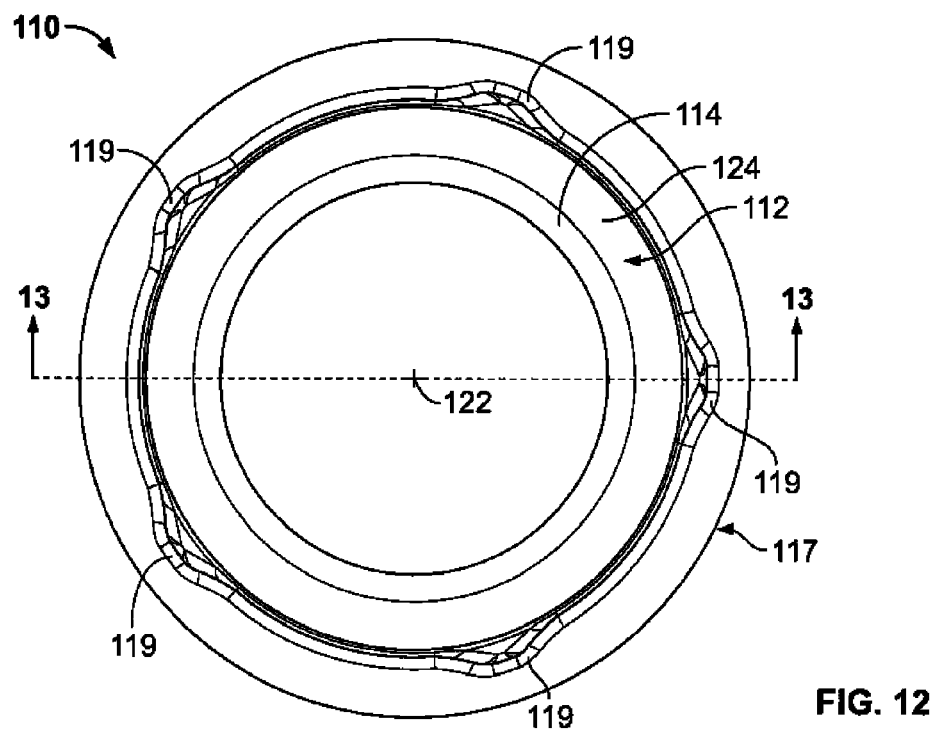
FIG. 12 is a top plan view of the collar shown in FIG. 9.

In an embodiment, FIG. 8 illustrates the collar 10 installed on a pin P. In an embodiment, the pin P has a pintail T with lock-grooves L. In an embodiment, the swaged collar 10 on the pin P fastens a work-piece W at a sheet line zone Z. More particularly, in an embodiment, the first interior surface 26 of the shank 20 is swaged on the lock-grooves L of the pintail T, and the surface 18 of the flange 17 bears on the sheet line zone Z of the work-piece W.

It is understood that the design of the longitudinal length and the configuration of the curvilinear surface 44, which is necessary to achieve the moderation of the tool swage loads as described hereinabove, may vary for changes in various parameters such as collar 10 metallurgy, size, etc. In one or more embodiments, the design of the longitudinal length and the configuration of the curvilinear surface 44 may be established: i) empirically, ii) by known metallurgical-engineering calculations, or iii) by a combination of both methods.

In an embodiment, the variable wall thickness of the shank 20 of the collar 10 promotes moderation in forward extrusion and reduced swaging loads. As a result, the power requirements, size and weight of the installation tool used to swage the collar 10 are also reduced. In addition, in an embodiment, a tool stop feature provided by the protrusion 50 of the collar 10 prevents the anvil of the installation tool from reaching the flange or the sheet line zone of the work-piece, and, thus, reduces the risk of producing collar splaying as well as damage to work-piece members that are made of sensitive materials, such as, for example, composites. In an embodiment, the protrusion 50 of the collar 10 also accepts and conveniently displays final witness marks, which provide rapid visual confirmation of a proper and complete swage.

In an embodiment, as indicated above, since the collar 10 encounters forward extrusion during swaging, as a natural consequence of the swaging process, a variable thickness profile of the shank 20 of the collar 10 compensates for this phenomenon. In an embodiment, if the thickness of the collar 10 is gradually reduced towards the second end 16 of the collar 10 (i.e., towards the flange 17), taking into account the amount of the material that will be forward extruded ahead of the tool, a substantially constant swage load is achieved during the swaging process. More particularly, the interior surface 25 and/or exterior surface 36 may be varied to accomplish a variable wall thickness shank 20, which will promote a reduction in forward extruded material and a substantially moderated swaging load.

It should be noted that the present invention can have numerous modifications and variations. For instance, in an embodiment, as will be described in detail hereinbelow, the interior surface 25 of the shank 20 may also be varied in order to vary the thickness of the collar 10 and to moderate forward extrusion and swaging loads. In addition, in other embodiments, a plurality of lobes or cogs may be positioned symmetrically around the circumference of the exterior surface 36 of the collar 10 to replace the protrusion 50 of the collar 10, and provide a leverage point for a torque wrench.

FIGS. 9-14 and FIG. 15 depict second and third embodiments, respectively, of the present invention. Elements illustrated in FIGS. 9-14, and FIG. 15 which correspond, either identically or substantially, to the elements described above with respect to the embodiment of FIGS. 1-6 have been designated by corresponding reference numerals increased by one hundred and two hundred, respectively. Unless otherwise stated, the embodiments of FIGS. 9-14, and FIG. 15 are constructed and assembled in the same basic manner as the embodiment of FIGS. 1-6.

FIGS. 9-14 illustrate a variable wall thickness collar 110 constructed in accordance with a second embodiment of the present invention. In an embodiment, the collar 110 includes a first end 112 having a flat surface 114, and a second end 116 opposite the first end 112 and having a flange 117 with a flat surface 118. In an embodiment, a plurality of lobes or cogs 119 are formed proximate to the flange 117, which act as tool stops and, alternately, leverage points for a torque wrench. In an embodiment, a tubular-shaped wall or shank 120 extends between the first and second ends 112, 116 of the collar 110.

Figure 13:
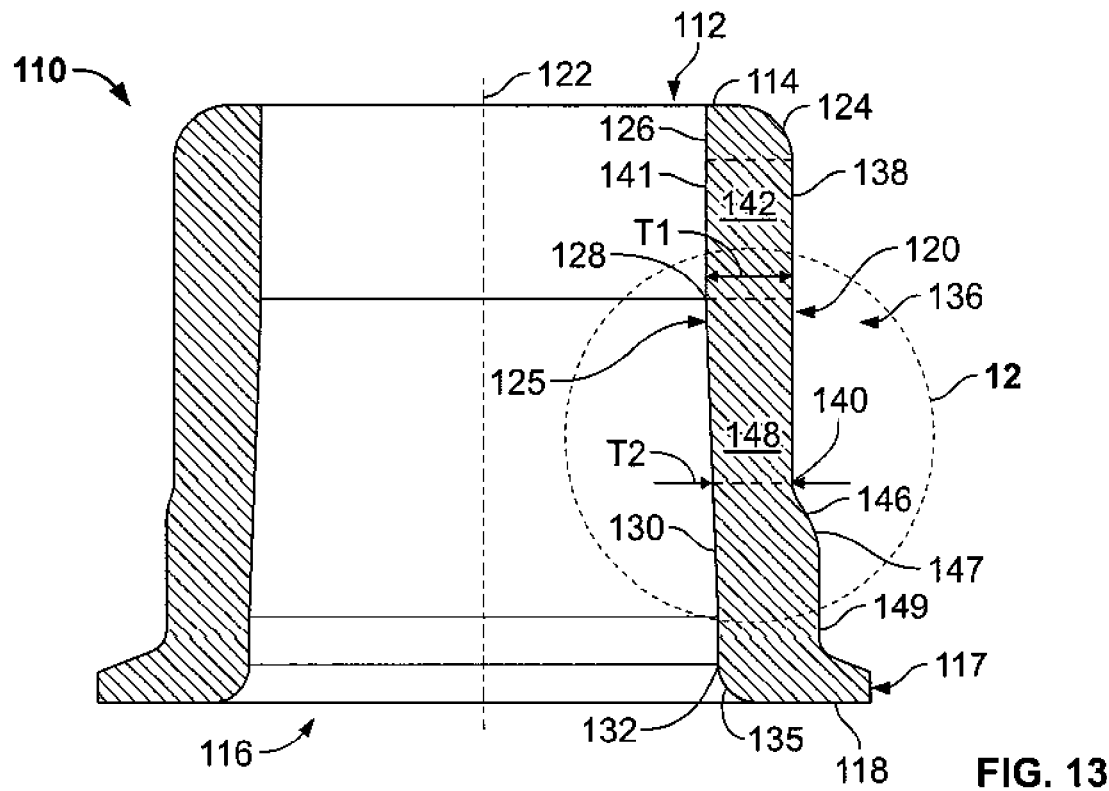
FIG. 13 is a cross-sectional view, taken along section line 13-13 and looking in the direction of the arrows, of the collar shown in FIG. 12.
Figure 14:
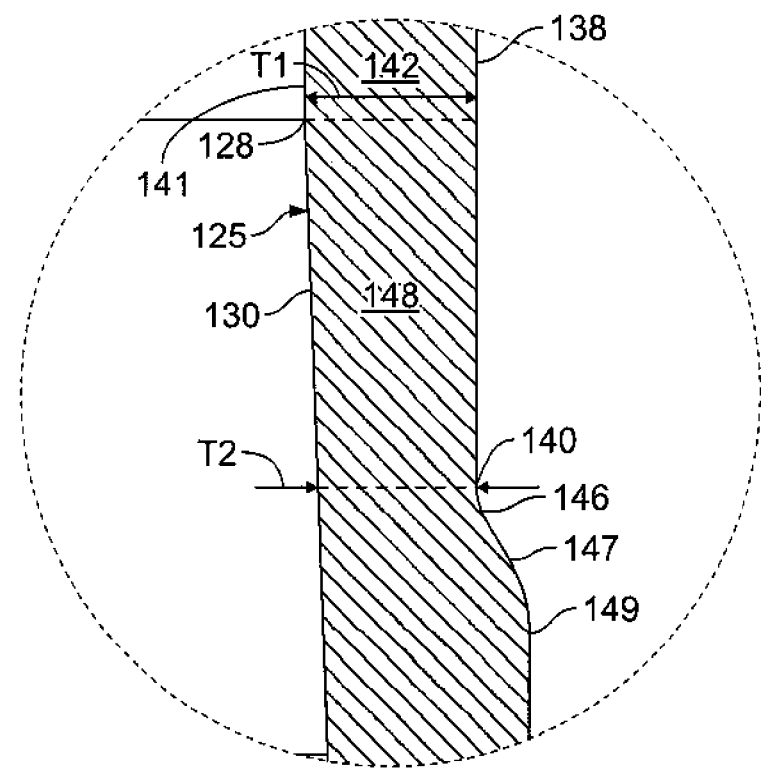
FIG. 14 is a an enlarged view of the circled area 14 of the shank shown in FIG. 13.

Referring to FIGS. 13 and 14, in an embodiment, the shank 120 is centered axi-symetrically around a longitudinal axis 122 of the collar 110. In an embodiment, the variable shaped interior surface or profile 125 of the collar 110 includes the following features. In an embodiment, beginning at the first end surface 114 of the collar 110, a cylindrical-shaped first interior surface 126 is orientated parallel to the longitudinal axis 122 of the collar 110, and it extends to a first interior inflection point 128. In an embodiment, from the first interior inflection point 128, a frusto-conical-shaped second interior surface 130 extends to a second interior inflection point 132, which is positioned on an interior corner 135. In an embodiment, the second interior surface 130 is oriented slightly oblique to the longitudinal axis 122.

In an embodiment, the shank 120 has a variable shaped exterior surface or profile 136 that is centered axi-symetrically around the longitudinal axis 122 of the collar 110. In an embodiment, the exterior surface 136 includes the following features. In an embodiment, beginning at the surface 114 of the collar 110, a corner 124 extends from the surface 114 to a first exterior surface 138. In an embodiment, the first exterior surface 138 extends to a first exterior inflection point 140. In an embodiment, the first exterior surface 138 and an adjacent area 141 of the first interior surface 126 combine to define a first zone 142 on the shank 120 having a first thickness T1. In an embodiment, the first exterior surface 138 extends to a second exterior inflection point 146. In an embodiment, an annular curved shaped protrusion 147 extends from the second exterior inflection point 146 to a second exterior surface 149. In an embodiment, the second exterior surface 149 terminates at the flange 117 of the collar 110. In an embodiment, the first exterior surface 138 and an adjacent area 147 of the second interior surface 130 combine to define a second zone 148 on the shank 120 having a second thickness T2. In an embodiment, the second thickness T2 is a minimum thickness. In an embodiment, the second thickness T2 is less than the first thickness T1 of the first zone 142.

As described hereinabove, the embodiments of FIGS. 9-14 (i.e., collar 110) are constructed and assembled in the same basic manner as the embodiments of FIGS. 1-6 (i.e., collar 10). Likewise, the swaging processes for the collar 110 operate in the same basic manner as the swaging processes for the collar 10, as described hereinabove.

Figure 15:
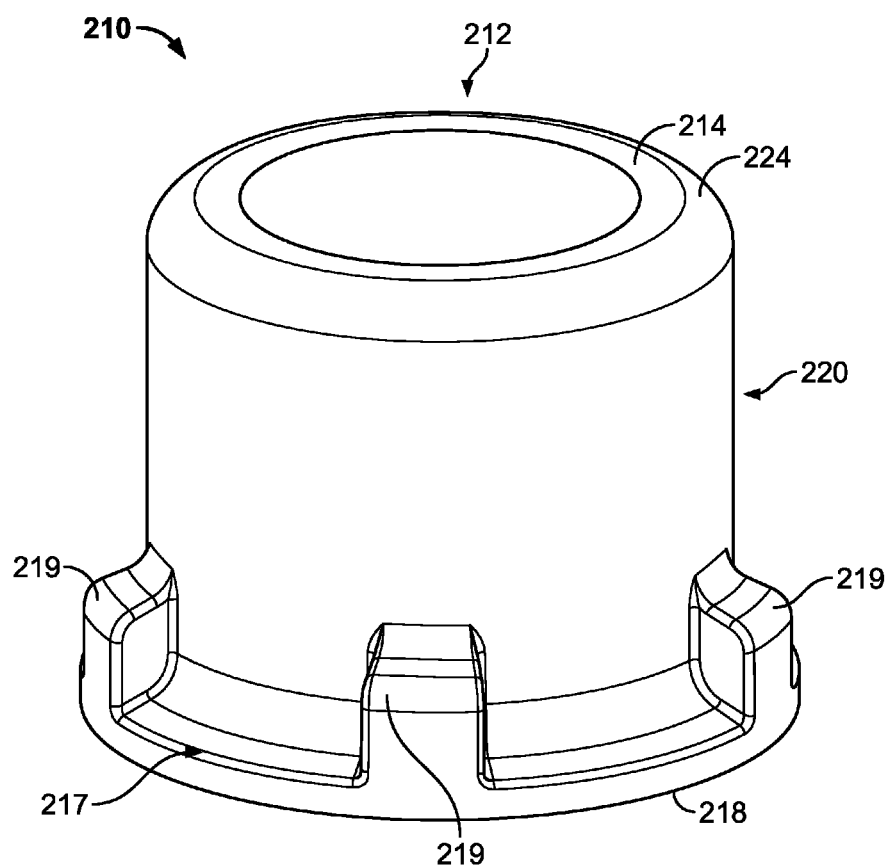
FIG. 15 is a perspective view of a collar constructed in accordance with a third embodiment of the present invention.

FIG. 15 depicts a variable wall thickness collar 210 constructed in accordance with a third embodiment of the present invention. In an embodiment, the collar 210 includes a first end 212 having a flat surface 214, and a second end 216 opposite the first end 212 and having a flange 217 with a flat surface 218. In an embodiment, a tubular-shaped wall or shank 220 extends between the first and second ends 212, 216 of the collar 210. In an embodiment, a plurality of lobes or cogs 219 are formed proximate the flange 217, which act as tool stops and, alternately, leverage points for a torque wrench (not shown in the Figures). More particularly, in an embodiment, the wrench, which has recessed features that mate with the cogs 219, may be fitted on the cogs 219. Once fitted on the cogs 219, the wrench may be used to exert torque on the collar 210, in order to unscrew the collar 210 from the lock-grooves L of the pin P, if the lock-grooves are threaded.

It will be understood that the embodiment described herein is merely exemplary and that a person skilled in the art may make many variations and modifications without departing from the spirit and scope of the invention. For instance, all such variations and modifications, in addition to those described above, are intended to be included within the scope of the invention as defined in the appended claims.

What is claimed is:

1. A collar, comprising: a first end and a second end opposite the first end, a longitudinal axis extending from the first end to the second end, and a shank extending from the first end to the second end and including an interior surface and an exterior surface, wherein the interior surface of the shank includes a first interior surface extending from the first end to a first interior inflection point, a second interior surface extending from the first interior inflection point to a second interior inflection point, and a third interior surface extending from the second interior inflection point to the second end, wherein the exterior surface of the shank includes a first exterior surface extending from the first end to a first exterior inflection point, and a curvilinear exterior surface extending from the first exterior inflection point to a second exterior inflection point, and wherein the curvilinear exterior surface and an imaginary line extending from the first exterior inflection point to the second exterior inflection point form a first area that is sized and shaped to receive forward extrusion of the collar as the collar is being installed.

2. The collar of claim 1, wherein each of the first and third interior surfaces is oriented parallel to the longitudinal axis, and the second interior surface is oriented oblique to the longitudinal axis.

3. The collar of claim 2, wherein the first interior surface and the first exterior surface form a first zone having a first thickness, and wherein the curvilinear exterior surface and a first area on the interior surface adjacent to the curvilinear exterior surface form a second zone having a second thickness.

4. The collar of claim 3, wherein the second thickness of the second zone is less than the first thickness of the first zone.

5. The collar of claim 4, wherein the exterior surface includes a protrusion positioned proximate to the second end.

6. The collar of claim 5, wherein second thickness of the second zone increases as the collar is being installed.

7. The collar of claim 6, wherein the exterior surface includes a third exterior surface, and wherein the protrusion extends longitudinally from the second exterior inflection point to the third exterior surface.

8. The collar of claim 7, wherein the third exterior surface terminates at a flange.

9. The collar of claim 5, wherein the protrusion is an annular protrusion.

10. The collar of claim 9, wherein the annular protrusion is ring-shaped.

11. The collar of claim 10, wherein the annular protrusion is curvilinear in shape.

12. The collar of claim 1, wherein the first interior surface and the third interior surface are each cylindrical in shape, and the second interior surface is frusto-conical in shape.

\* \* \* \* \*